US006618516B1

(12) United States Patent
Huang

(10) Patent No.: US 6,618,516 B1
(45) Date of Patent: Sep. 9, 2003

(54) OPTICAL SWITCHING DEVICES

(75) Inventor: Austin Huang, Dallas, TX (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/783,826

(22) Filed: Feb. 14, 2001

(Under 37 CFR 1.47)

(51) Int. Cl.[7] .................................................. G02B 6/28
(52) U.S. Cl. ........................... 385/16; 385/20; 385/24; 385/11; 385/18
(58) Field of Search ............................... 385/16–22, 24, 385/11

(56) References Cited

U.S. PATENT DOCUMENTS

| | | | |
|---|---|---|---|
| 4,385,799 A | * 5/1983 | Soref | 385/17 |
| 5,381,251 A | 1/1995 | Nonomura et al. | 359/39 |
| 5,694,233 A | 12/1997 | Wu et al. | 359/117 |
| 5,748,811 A | 5/1998 | Amersfoort et al. | 385/15 |
| 5,875,272 A | 2/1999 | Kewitsch et al. | 385/37 |
| 5,915,051 A | 6/1999 | Damask et al. | 385/16 |
| 5,937,117 A | 8/1999 | Ishidda et al. | 385/24 |
| 5,946,430 A | 8/1999 | Morrow et al. | 385/24 |

* cited by examiner

*Primary Examiner*—Hung N. Hgo
(74) *Attorney, Agent, or Firm*—Chernoff Vilhauer McClung & Stenzel, LLP

(57) ABSTRACT

A device switching an output of a polarized light beam on the basis of the beam's polarization state is disclosed. Optical "add," "drop," and crossbar switch devices for multiplexed optical signals are based on wavelength specific embodiments of the optical switching device.

91 Claims, 5 Drawing Sheets

OPTICAL SWITCHING DEVICES

CROSS-REFERENCE TO RELATED APPLICATIONS

Not applicable.

BACKGROUND OF THE INVENTION

The present invention relates to optical switching devices and, more particularly, to optical devices for selectively redirecting light as a function of its polarization state.

Optical wave or wavelength division multiplex (WDM) systems utilize multiplexing to transmit a plurality of optical signals over a single optical fiber. The bandwidth of the optical fiber is divided into several wavelength bands each occupied by a single carrier signal or channel modulated by one or more information signals. As a result, several information signals can be transmitted over a single optical fiber. Early WDM systems took advantage of two major windows in the optical fiber for transmission of two channels. More recently, so-called coarse and dense wavelength division multiplex (DWDM) systems have multiplexed nearly 100 channels with data rates approaching 2.5 Gbits per sec. on a single fiber.

While WDM provides a mechanism for more effective utilization of the available bandwidth of the optical fiber, multiplexing, demultiplexing, and routing individual optical signals require the development of fast, efficient optical switching and filtering devices. A multiplexer utilizes switching devices in an "add" device to combine multiple individual channels (each defined by its own wavelength spectrum) into a single WDM signal. On the other hand, demultiplexing is the process of separating or dropping individual channels from the composite WDM signal and coupling the individual channels to specific outputs for further processing. Routing is the process of permuting an input channel to a selected output port in response to a control signal imposed on a switching device.

Optical multiplexing and demultiplexing have been performed with prisms to combine and separate light of individual colors in a multiplexed signal. In addition, filters based on fiber Bragg gratings (FBG) and array waveguide-gratings are used as add and drop wavelength filters. The filters are typically switched in and out of the optical path of the signals using electro-optical modulation techniques.

What is desired is a switching device providing rapid, efficient, and reliable wavelength specific, optical switching.

DETAILED DESCRIPTION OF THE INVENTION

Optical wavelength or wave division multiplexing is the process of combining a plurality of optical signals for transmission over a single optical fiber. The transmission spectrum of the optical fiber is divided into a plurality of wavelength bands or channels. A carrier signal, modulated by one or more information signals, is transmitted in each channel. Initially, wave division multiplex (WDM) systems exploited two channels in an optical fiber. So-called coarse and dense wave division multiplex (DWDM) systems have increased the number of channels that can be transmitted in a single fiber. A DWDM system is generally considered to be a system having eight or more channels. Systems with nearly one hundred channels and bandwidth approaching 2.5 Gbits per second are contemplated in the near term for DWDM. Essential components of DWDM are devices to add individual signals together to form multiplexed signals, separate or drop an individual signal from a multiplexed signal, and route a signal from an input fiber to one of several output fibers. Heretofore, prisms and mechanical grating reflectors switched in and out of the optical path by electro-optical means have been used to separate and combine light of differing wavelengths. The present inventor concluded that the reliability, speed, and cost of "add," "drop," and routing devices for WDM could be improved by selectively switching the polarization of individual signals and filtering signals on the basis of the signal's polarization.

Figure 1:
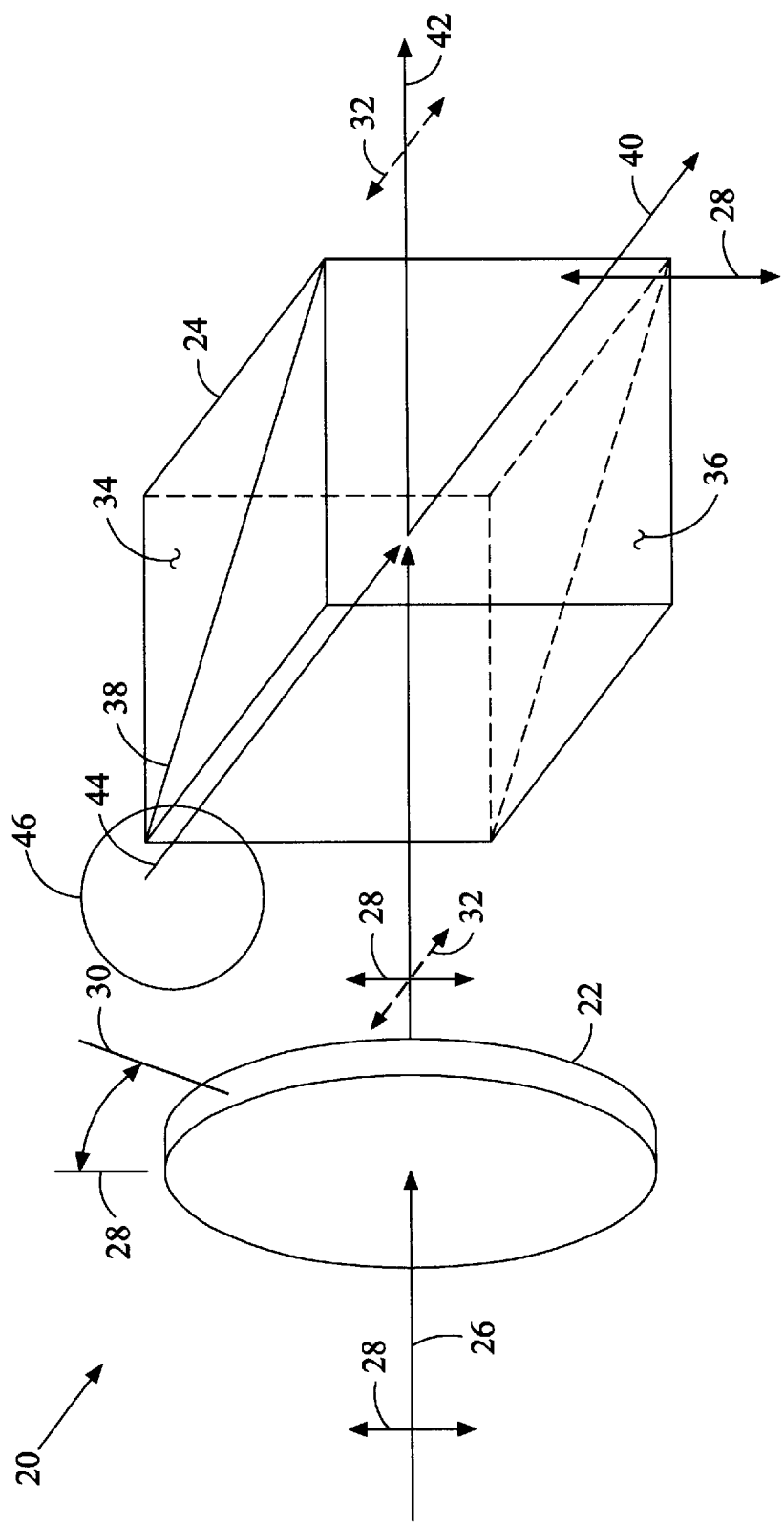
FIG. 1 is a schematic illustration of optical switching devices of the present invention.

Referring to FIG. 1, the optical switching devices of the present invention 20 comprise generally a switchable half-wave plate 22 and a polarizing beam splitter 24 in the optical path of an incident polarized light beam 26. As it is illustrated, the exemplary incident beam 26 is plane polarized normal to the optical path of the beam with a vertical plane of polarization (polarization state) 28. An optical retarder retards the phase of a light wave to alter the beam's polarization. The interaction between light and the atoms of some crystals varies according to the relative orientation of the electric field vector of the light and the crystalline axis. This produces birefringence or a refractive index that differs as a function the plane of polarization of the light. For example, a half-wave plate or retarder retards the phase of the incident beam by twice the angle between the fast axis 30 of the retarder and the plane of polarization of the incident light beam. If the fast axis 30 of the retarder 22 is arranged 45° to the plane of polarization 28 of the incident beam 26, the half-wave plate will change the plane of polarization from the vertical plane 28 to the horizontal plane 32. The same effect can be produced by two quarter wave plates with each of the wave plates producing one half of the rotation of the plane of polarization.

Liquid crystal wave plates, comprising a thin layer of liquid crystals between parallel windows, can be selectively switched from a phase retarding to a non-retarding mode by the application of a voltage to electrodes in the windows. The liquid crystals exhibit a dipole moment that causes the crystal to align itself with an electric field produced by the energized electrode. In response to the application of a voltage to the electrodes, the column of the crystals between two electrodes can be caused to twist retarding the polarization of light incident to the column. A liquid crystal half-wave plate provides a convenient mechanism to change the plane of polarization from first plane to an orthogonal or non-orthogonal, a second plane. In addition, the rotation of the polarization plane produced by a liquid crystal waveplate can be varied by varying the voltage applied to the electrodes permitting the polarization switched to more than two states.

The light passing through the optical retarder 22 enters the polarizing beam splitter 24. The polarizing beam splitter 24 comprises typically two prisms of triangular cross-section 34 and 36 joined at one side. The joined sides create a beam splitting internal surface 38 comprising a pair of parallel, internally reflecting surfaces bounding a plane with an index of refraction different from that of the prisms. Similarly, a polarizing beam splitter can be constructed from a thin sheet of transparent material aligned at an angle to the optical path of the incident light. Light striking the internal surface 38 with a plane of polarization parallel to the surface (vertical 28 in the illustration) or s-state polarized light is reflected by the surface and exits the beam splitter on a path 40 normal to the optical path of the incident beam 26. On the other hand, light with a plane of polarization normal (horizontal 32, as illustrated) to the internal surface 38 or p-state polarized is not reflected by the reflective surface 38 and is transmitted through the beam splitter on an optical path 42 coincident with that the incident beam 26. The incident light 26 can be switched between the two outputs 40 and 42 by the application of a voltage to the liquid crystal half-wave plate 22.

A second embodiment of the optical switching device 20 has a second input light beam 44 incident to the polarizing beam splitter 24 in a direction orthogonal to the optical path of the first beam 26. Since the internal surface 38 of the polarizing beam splitter 24 is actually a plane with a front and a back surface, beam splitting can occur for light incident to the surface 38 from either orthogonal direction. A second switchable optical retarder 46 controlling the polarization state of the second beam 44 allows the switching device 20 to switch either of two input beams 26 and 44 to either of two outputs 40 and 42.

Figure 2:
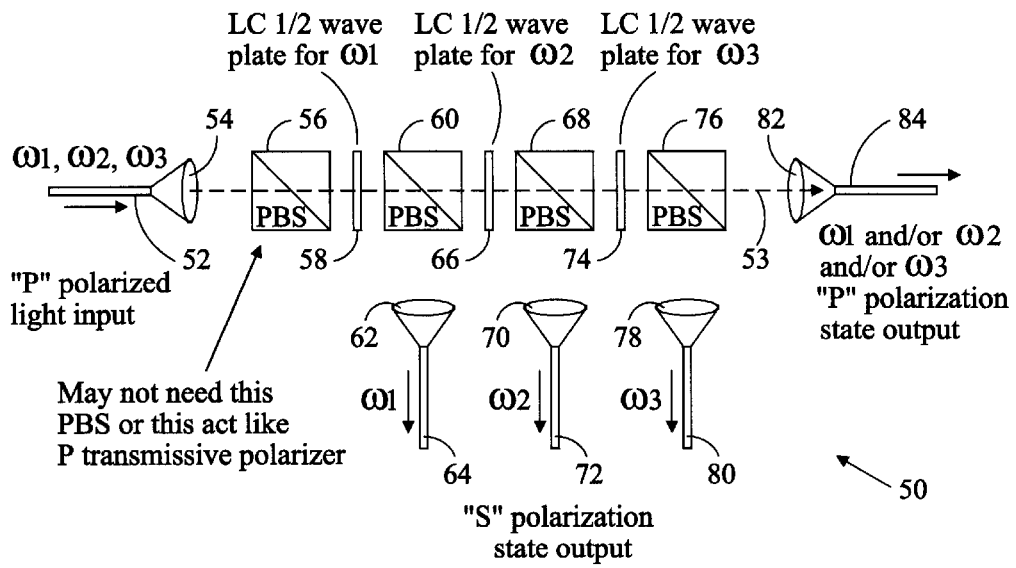
FIG. 2 is a schematic illustration of an optical "drop" device of the present invention.

Referring to FIG. 2, the optical switching device 20 provides the basic element of an optical drop device 50 useful in demultiplexing a complex optical signal including polarized light comprising wavelengths in a number of wavelength bands or wave divisions. The wavelength bands include light of one or more wavelengths in continuous or discontinuous, overlapping or non-overlapping ranges. Light comprising individual signals in exemplary wavelength bands centered around wavelengths $\omega_1$, $\omega_2$, and $\omega_3$ (referred to variously as $\omega_1$, $\omega_2$, and $\omega_3$ light or bands) enters the optical drop device 50 through an optical fiber 52. The light passes through a collimating lense 54 to align the light with the optical axis 53 of the main beam in the device. The generally p-polarized light may also be passed through an analyzer 56 to clean up the beam by removing any unwanted polarization states. The analyzer 56 is typically constructed from a polarizer, a full-wave optical retarder, or, as illustrated, a polarizing beam splitter. Light leaving the analyzer 56 passes through an $\omega_1$, wavelength specific half-wave plate 58. Birefringence is a function of the wavelength of the incident light and the $\omega_1$ half-wave plate 58 is chosen to selectively retard light with frequencies in $\omega_1$ band. Light passing through the $\omega_1$, half-wave plate 58 encounters the polarizing beam splitter 60. If the liquid crystal, $\omega_1$ half-wave plate 58 is in the polarization changing mode, the polarization state of the light in the $\omega_1$ band will be changed from the p-state to the s-state by the $\omega_1$ half-wave plate 58. As a result, the light of the $\omega_1$ band will be reflected from the internal surface of the $\omega_1$ polarizing beam splitter 60 into a collimating lens 62 and an output fiber 64. Since the p-polarization of the $\omega_2$ and $\omega_3$ wavelength bands is unaffected by the wavelength specific $\omega_1$ half-wave plate 58, light of these two bands will be transmitted through the $\omega_1$ polarizing beam splitter 60 and then through the $\omega_2$ half-wave plate 66. Likewise, if the $\omega_1$ half-wave plate 58 is not switched to the polarization changing mode, the polarization of the light of the $\omega_1$ wavelength band will be unaffected by the $\omega_1$ half-wave plate 58 and the light of the $\omega_1$ band will be transmitted through the $\omega_1$ polarizing beam splitter 60.

Light passing through the $\omega_1$ polarizing beam splitter 60 encounters the $\omega_2$ half-wave plate 66. If the $\omega_2$ half-wave plate 66 is switched to the polarization changing mode, the light of the $\omega_2$ wavelength band will be directed into the collimating lens 70 and a second output fiber 72. Likewise, light of the $\omega_3$ band passing through the $\omega_2$ polarizing beam splitter 68 can be separated from the main beam by the $\omega_3$ half-wave plate 74 and the $\omega_3$ polarizing beam splitter to exit through the collimating lens 78 and the third output fiber 80. Light from wavelength bands that have not been "dropped" from the main beam will pass through the $\omega_3$ polarizing beam splitter 76 and a collimating lens 82 and exit the device through an output fiber 84. The drop device 50 can be used to separate light of each of the constituent channels or wavelength bands from the combined beam at the input fiber 52. Switchable optical retarders, such as liquid crystal, half-wave plates, permit switchable demultiplexing of the combined signal, but optical retarders that are not switchable, such as crystal wave plates, can be used if switchable signal dropping is not required.

Figure 3:
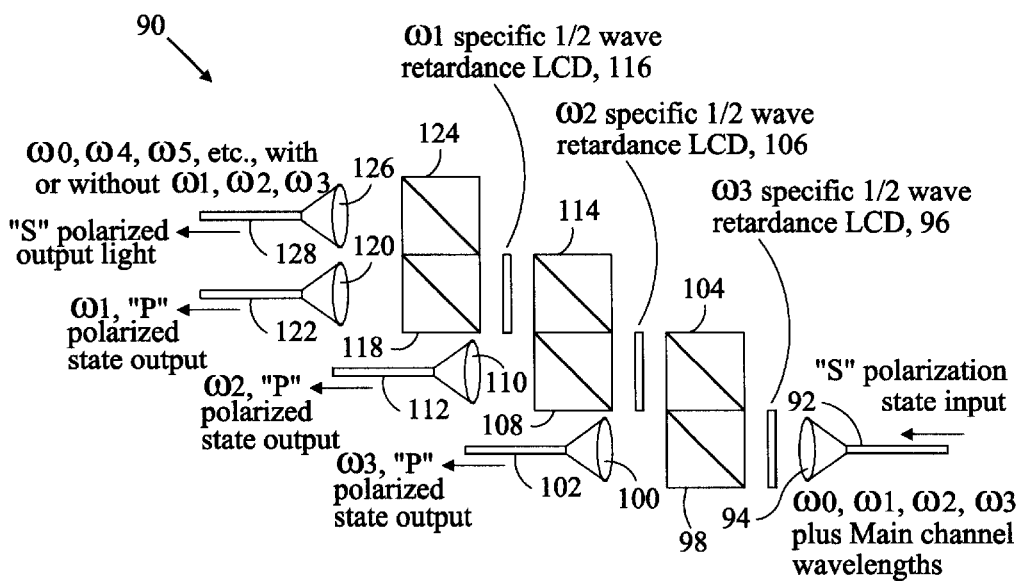
FIG. 3 is a schematic illustration of an alternate embodiment of the optical "drop" device illustrated in FIG. 2.

FIG. 3 illustrates an alternative embodiment 90 of a drop mechanism using the techniques of the present invention. A beam of s-polarized light, including light in constituent wavelength bands $\omega_1$, $\omega_2$, and $\omega_3$, is introduced to the drop device 90 from an input fiber 92 and a collimating lens 94. The light passes through a wavelength band specific, $\omega_3$ half-wave plate 96. If the $\omega_3$ half-wave plate 96 is in the polarization changing mode, the polarization state of the light of the $\omega_3$ band is changed to the p-state and the light passes through an $\omega_3$ polarizing beam splitter to a collimating lens 100 and out of the drop device through an output fiber 102.

Since the polarization of the light in the $\omega_2$ and $\omega_1$ wavelength bands is unaffected by the wavelength specific $\omega_3$ half-wave plate 96, the light in these bands is reflected by the internal surface of the $\omega_3$ polarizing beam splitter 98 and a first reflector 104. The reflector 104 may be constructed from a polarizing beam splitter, as illustrated, but beam splitting is not required for redirecting the path of the beam. Likewise, the light of the $\omega_3$ band will be reflected from the internal surface of the $\omega_3$ polarizing beam splitter 98 and the first reflector 104 if the $\omega_3$ half-wave plate 96 is not in the polarization changing mode. Light leaving the first reflector 104 passes through an $\omega_2$ wavelength specific, half-wave plate 106. If the $\omega_2$ half-wave plate 106 is in the polarization changing mode, light in the $\omega_2$ band will be transmitted through the $\omega_2$ polarizing beam splitter 108 and out of the drop device 90 through the collimating lens 110 and the second output fiber 112. If the polarization of light passing through the $\omega_2$ half-wave plate 106 is unaffected by the wave plate, the light is reflected to the $\omega_1$ wavelength specific, half-wave plate 118 by the $\omega_2$ polarizing beam splitter 108 and a reflector 114. The $\omega_1$ half-wave plate 116 can be switched to toggle the polarization state of light in the $\omega_1$ band. Light of the $\omega_1$ band changed to p-state polarization will pass through the $\omega_1$ polarizing beam splitter 118 and exit the device through the collimating lens 120 and a third output fiber 122. Light passing through the $\omega_1$ half-wave plate 116 without a change in polarization is reflected by the $\omega_1$, polarizing beam splitter 118 and the third reflector 124 to the collimating lens 126 and exits the device through the main beam output fiber 128.

Figure 4:
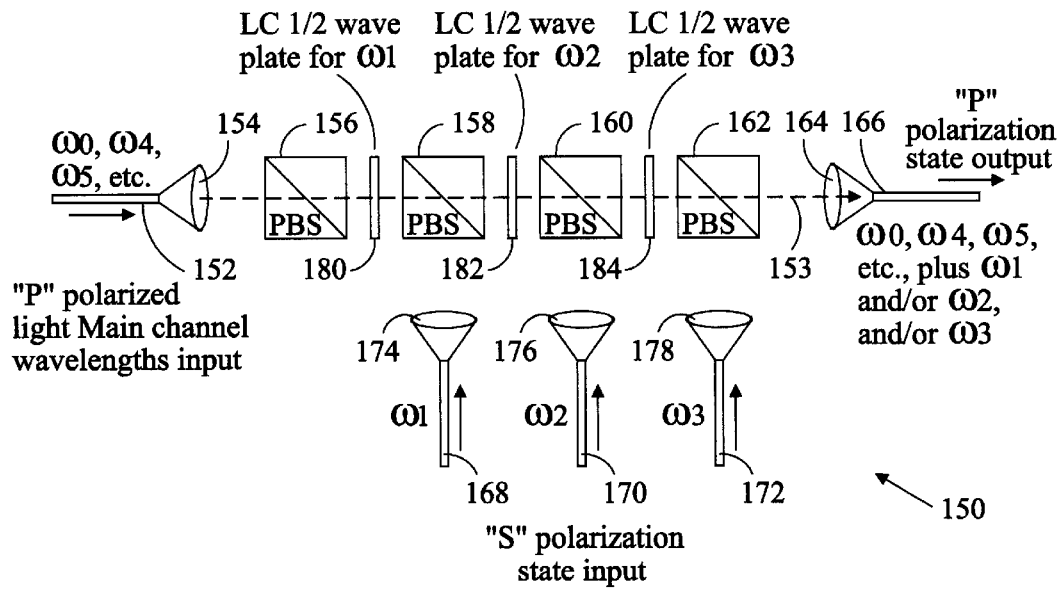
FIG. 4 is a schematic illustration of an optical "add" device of the present invention.

The optical switching device 20 can also be used as a basic element of an optical "add" device 150 as illustrated in FIG. 4. A main beam of light comprising light in a plurality of wavelength bands ($\omega_0$, $\omega_4$, and $\omega_5$) is input to the optical add device 150 through a main beam input fiber 152 and collimating lens 154. The light in the main beam is p-polarized and passes through an $\omega_1$ polarizing beam splitter 154, an $\omega_2$ polarizing beam splitter 156, and an $\omega_3$ polarizing beam splitter 160 on a main beam axis or path 153 from the main beam input fiber 152 to the output fiber 166. The main beam may be passed through an analyzer 162 to clean up the polarization of the beam before it exits the optical add device 150 at the output fiber 166. Fibers 168, 170, and 172 and collimating lenses 174, 176, and 178, respectively, provide the input ports for s-polarized light signals of the $\omega_1$ $\omega_2$, and $\omega_3$ wavelength bands, respectively. When the s-polarized light from fiber 168 strikes the reflective surface of the $\omega_1$ polarizing beam splitter 156, it is reflected coincident to main beam axis 153 between the main beam input fiber 152 and main output fiber 166. The light of the $\omega_1$ band reflected from the $\omega_1$ polarizing beam splitter 156 passes through a $\omega_1$ wavelength specific half-wave plate 182 where its polarization is changed to match the polarization state of the light in the main beam. As a result, the p-polarized light of the $\omega_1$ band will be added to the main beam and pass through the $\omega_2$ polarizing beam splitter 158 and $\omega_3$ polarizing beam splitter 160 to exit the add device in the main output fiber 166. If a switchable half-wave plate, such as a liquid crystal half-wave plate, is utilized for the $\omega_1$ half-wave plate 180, the add device can be used to selectively add light from the $\omega_1$ band to the main beam. If the $\omega_1$ half-wave plate 180 is not switched to the polarization changing mode, light leaving the $\omega_1$ polarizing beam splitter 156 will be s-polarized and reflected out of the device 150 by the reflective surface of the $\omega_2$ polarizing beam splitter 158. Similarly, light in the $\omega_2$ and $\omega_3$ bands entering the device 150 through fibers 170 and 172, respectively, can be added to the main beam by polarization rotation by the $\omega_2$ half-wave plate 182 and the $\omega_3$ half-wave plate 184, respectively.

Figure 5:
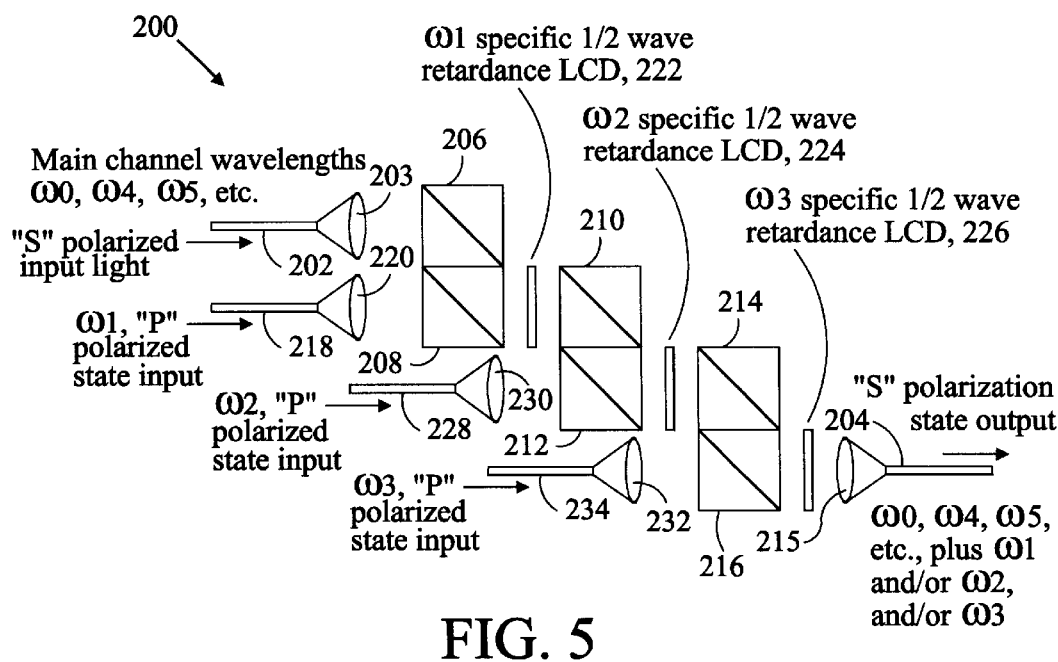
FIG. 5 is a schematic illustration of an alternate embodiment of the optical "add" device illustrated in FIG. 4.

Another embodiment 200 of the optical add device is illustrated in FIG. 5. S-polarized light of a main beam enters the add device 200 through a main fiber 202 and exits from the device through a main output fiber 204. The s-polarized light of the beam contains light of a plurality of wavelength bands centered on $\omega_0$, $\omega_4$, and $\omega_5$ and because of its s-polarization state the light is reflected by a first reflector 206, an $\omega_1$ polarizing beam splitter 208, a second reflector 210, an $\omega_2$ polarizing beam splitter 212, a third reflector 214 and an $\omega_3$ polarizing beam splitter 214 into the collimating lens 216 on the main beam's path 203 to the main output fiber 204. P-polarized light in the $\omega_1$ wavelength band is input to the add device 200 through an input fiber 218 and associated collimating lens 220. The p-polarized light passes through the $\omega_1$ polarizing beam splitter 208 and a $\omega_1$ wavelength specific half-wave plate 222 where the polarization state is changed to the s-state consistent with the polarization state of the main beam. With s-polarization, the light of the $\omega_3$ wavelength band will follow the path of the main beam 153 through the add device to the output fiber 204. Likewise, light of an $\omega_2$ wavelength band and an $\omega_3$ wavelength band are input through fibers 228 and 234 and collimating lenses 230 and 232, respectively. The polarization state of the $\omega_2$ wavelength light will be changed in the $\omega_3$ half-wave plate 224 and the polarization state of the $\omega_3$ light will be changed in the $\omega_3$ half-wave plate 226 permitting the light in these wavelength bands to join the main beam in the main output fiber 224. If either of the half-wave plates 222 or 224 are not in the polarization altering mode, light of the specific $\omega_1$ or $\omega_2$ wave divisions will pass of out of the device 200 at the polarizing beam splitters 212 or 216 following the half-wave plate for the respective signal. Since multiplexing often does not require the selective addition of signals, fixed optical retarders may be used instead in lieu of switchable liquid crystal retarders.

Figure 6:
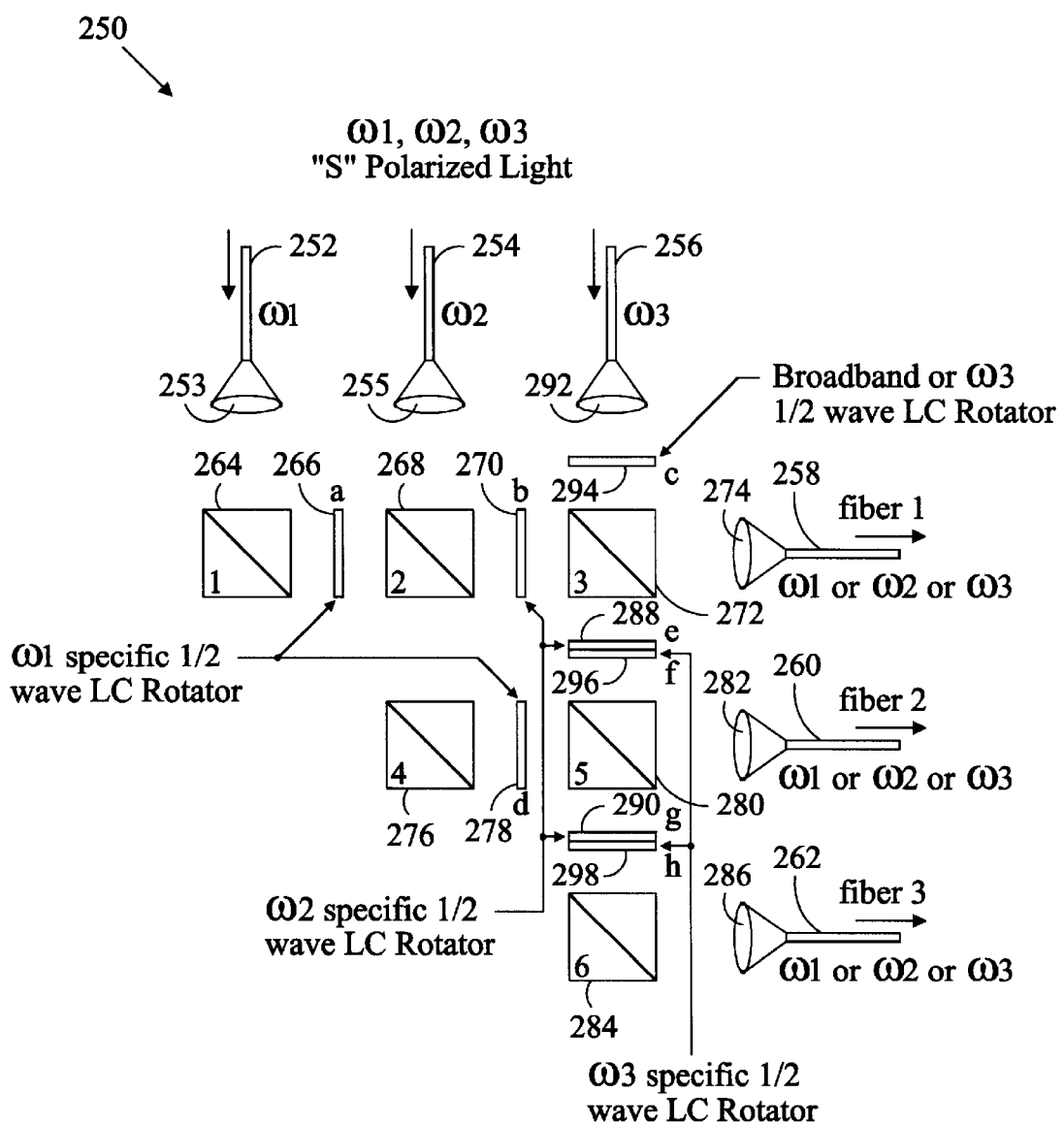
FIG. 6 is a schematic illustration of an optical cross bar switch of the present invention.

The optical switching device 20 can also be used as an element of an optical crossbar routing switch 250 as illustrated in FIG. 6. In the crossbar routing switch 250 s-polarized light of wavelength bands centered on wavelengths $\omega_1$, $\omega_2$, and $\omega_3$ is input at individual input fibers 252, 254 and 256, respectively. The crossbar switch facilitates selective routing of the light from any one of the plurality of inputs 252, 254, and 256 to any one of the plurality of output fibers 258, 260, or 262. Routing is performed by an array of polarizing beam splitters and switchable, wavelength specific optical retarders. For example, s-polarized light of the $\omega_1$ wavelength band input through fiber 252 is reflected by the reflective surface of a first reflector 264 through a first switchable, A wavelength specific half-wave plate 266. If the first switchable wave plate 266 is switched to the change mode, the polarization state is changed to the p-state and the light passes through the second input row polarizing beam splitter 268. From the beam splitter 268, the light passes through an $\omega_2$ wavelength specific half-wave plate 270, but since the plate is wavelength specific to the $\omega_2$ wave division, the polarization of the $\omega_1$ wavelength light is unaffected. As a result, the p-polarized light passes the third input row polarizing beam splitter 272 and the collimating lens 274 to the output fiber 258.

If, on the other hand, the first switchable half-wave plate 264 is not switched to the polarization changing mode, the light is reflected from the reflective surface of the second input row polarizing beam splitter 268 to an intermediate row reflector 276. Since the intermediate row reflector 276 is used only to redirect the path of the beam it may comprise any reflective surface and may be constructed from a beam splitter as illustrated. The light is reflected from the intermediate row reflector 276 through an $\omega_1$ wavelength specific half-wave plate 278. If the half-wave plate 278 is switched to the polarization changing mode, the polarization state is changed to the p-state and the light passes through the second, intermediate row polarizing beam splitter 280, the collimating lens 282 and into the output fiber 260. If the intermediate row half-wave plate 278 is not switched to the polarization changing mode, the s-polarized light is reflected by the second, intermediate row polarizing beam splitter 280 to a tertiary row polarizing beam splitter 284 that redirects the light through a collimating lens 286 and into the third output fiber 262.

S-polarized light of the $\omega_2$ wavelength band is reflected by the second, input row polarizing beam splitter through the switchable, $\omega_2$ wavelength specific, half-wave plate 270. If the half-wave plate 270 is switched to the polarization changing mode, the light passes through the polarizing beam splitter 272 and into the output fiber 258. If the half-wave plate 270 is not in the polarization changing mode, the s-polarized light is reflected from the reflective surface of the third, input row polarizing beam splitter 272 through a switchable, $\omega_2$ wavelength specific, half-wave plate 288. If the half-wave plate 288 is not switched to the polarization changing mode the s-polarized light is reflected by the second, intermediate row polarizing beam splitter 280 to the second output fiber 260. The polarizing beam splitter 280 implements the second embodiment of the switching device 20 with a horizontal input beam and a vertical input beam either of which can be switched to the device's horizontal or vertical outputs. On the other hand, if the half-wave plate 288 is switched to the polarization changing mode, the polarization of the $\omega_2$ wavelength light is changed to the p-state and the light passes through the second intermediate row polarizing beam splitter 280 and through a switchable, $\omega_2$ wavelength specific, half-wave plate 290. If the half-wave plate 290 is switched to the polarization changing mode, the polarization state is switched from p-state to the s-state and the light is reflected from the tertiary row reflector 284 to the third output fiber 262.

S-polarized light of the $\omega_3$ wavelength band enters the crossbar switch 250 through input fiber 256 and collimating lens 292. The light passes through a switchable half-wave plate 294. Since the light input from fiber 256 is monochromatic the $\omega_3$ band, the half-wave plate 294 can be either $\omega_3$ wavelength specific or a broad band optical retarder. If the half-wave plate 294 is not in the polarization changing mode, the s-polarized light is reflected by the input row polarizing beam splitter 272 to the first output fiber 258. If the half-wave plate 294 is switched to the polarization changing mode, the polarization state is changed to the p-state and the light passes through the input row polarizing beam splitter 272 and through an intermediate row, switchable $\omega_3$ wavelength specific, half-wave plate 296. If the half-wave plate 296 is switched to the polarization changing mode, the polarization state is again changed to the s-state and the light is reflected from the second, intermediate row polarizing beam splitter 280 to the second output fiber 260. If the half-wave plate 294 is not in the polarization changing mode the p-polarized light is transmitted through the second, intermediate row, polarizing beam splitter 280 to a tertiary row switchable, $\omega_3$ wavelength specific, half-wave plate 298. If the polarization of the light is retarded by the third row half-wave plate 298, the p-polarized light is changed to s-state polarization and reflected by the tertiary row polarizing beam splitter 284 to the third output fiber 262.

Figure 7:
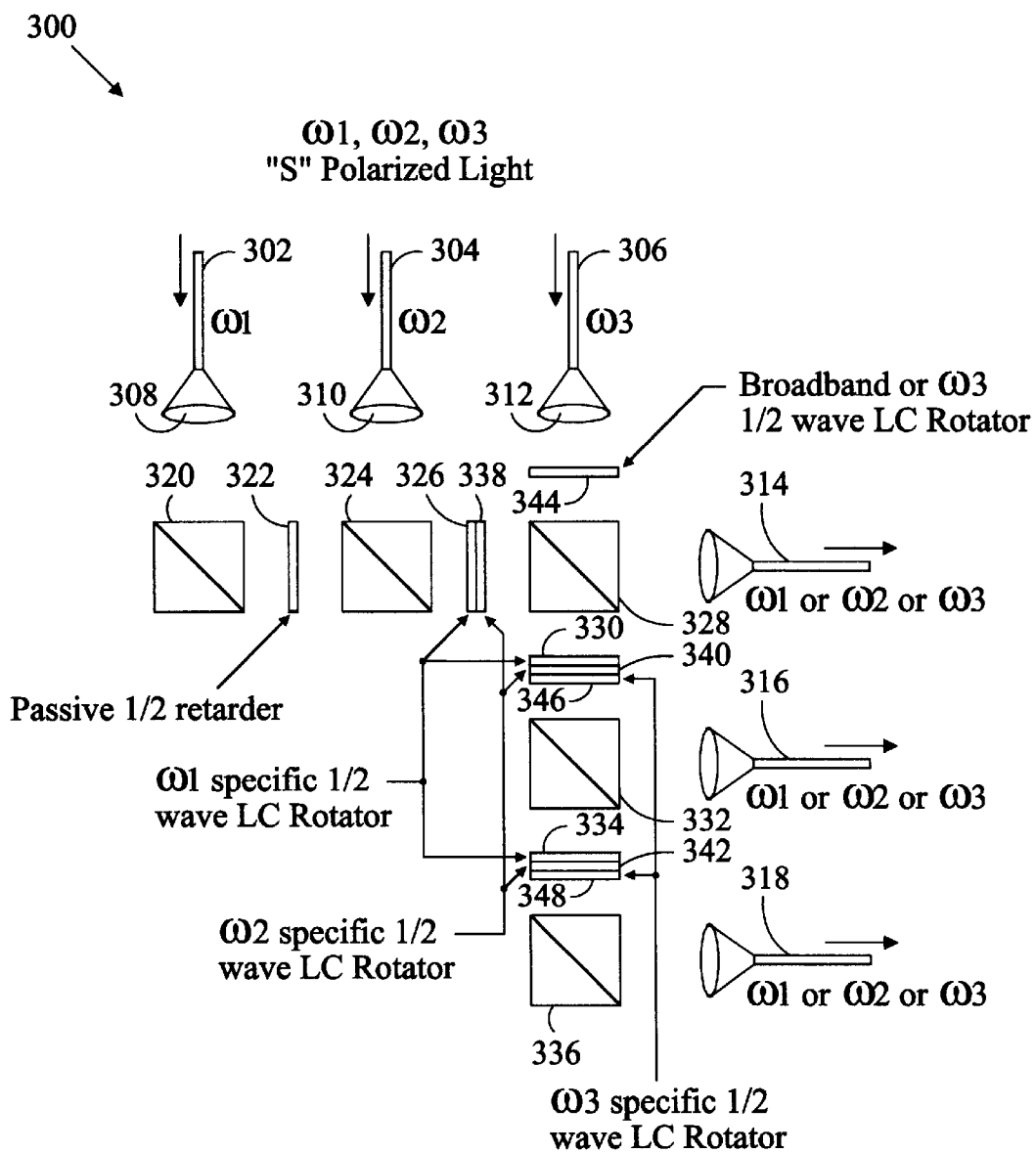
FIG. 7 is a schematic illustration of an alternate embodiment of the optical crossbar switch illustrated in FIG. 6.

An alternative embodiment 300 of the optical crossbar switch requiring fewer polarizing beam splitters is illustrated in FIG. 7. In the alternative embodiment 300 a plurality of a wavelength specific optical retarders are used to control the polarization states of a plurality of input beams incident to a single polarizing beam splitter. Light with wavelengths in bands centered on wavelengths $\omega_1$, $\omega_2$, and $\omega_3$ is input to the switch through optical fibers 302, 304, and 306, respectively, and the associated collimating lenses 308, 310, and 312 and selectively routed to output fibers 314, 316, and 318. For example, s-polarized λ wavelength light introduced to the switch 300 through fiber 302 is reflected by a reflector 320 through a $\omega_1$ wavelength specific, half-wave plate 322. The reflector 320 may be constructed from a polarizing beam splitter as illustrated but since it serves only to redirect the light from the fiber 302 beam splitting is not required. If the half-wave plate is not in the polarization changing mode, the spolarized light will be reflected out of the switch by the second, input row polarizing beam splitter 324. On the other hand, if the half-wave plate 322 is switched to the polarization changing mode, the polarization is changed to the p-state and the light transmitted through the second, input row polarizing beam splitter 324 to a second, $\omega_1$ wavelength specific, half-wave plate 326. If the second half-wave plate 326 is not in the change mode, the p-polarized light will pass through the third input row, polarizing beam splitter 328 and exit through the output fiber 314. If the second, $\omega_1$ wavelength specific, half-wave plate 326 is switched to the change mode, the polarization of the light will be switched to the s-state and the light will be reflected by the third input row, polarizing beam splitter 328 down the vertical column of optical retarders and beam splitters with a plurality of other beams to a third, $\omega_1$ wavelength specific, half-wave plate 330. If the half-wave plate 330 is not in the polarization changing mode, the s-polarized light will be reflected by an intermediate row polarizing beam splitter 332 to the output fiber 316. However, if the third, $\omega_1$ wavelength specific, half-wave plate 330 is in the change mode, the polarization state will be changed to the p-state and the light will pass through the intermediate row polarizing beam splitter 332 and through a fourth, $\omega_1$ wavelength specific, half-wave plate 334. The polarization of p-polarized light will again be switched by the half-wave plate 334 and the resultant s-polarized light will be reflected by the tertiary row output reflector 336 to the output fiber 318. The tertiary row reflector 336 may be a polarizing beam splitter as illustrated.

S-polarized, $\omega_2$ wavelength light from input fiber 304 will follow a similar path through the array of polarizing beam splitters, reflectors, and half wave plates. The light will be directed to an output fiber 314, 316, or 318 by the switching of $\omega_2$ wavelength specific, half-wave plates 338, 340, and 342 to appropriate the polarization state changing or non-changing modes. Similarly, s-polarized $\omega_3$ wavelength light from input fiber 306 will be directed to an output fiber 314, 316, or 318 by appropriate switching of $\omega_3$ wavelength specific, half-wave plates 344, 346, and 348.

Liquid crystal optical retarders provide a reliable, non-mechanical apparatus for altering the polarization of light. Optical retarders can be combined with a polarizing beam splitter to create an optical switching device. With a wavelength specific half-wave plate, the basic optical switching device forms the basic element of devices to add, drop, and route light of specific wavelength bands in a wavelength division multiplex system.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. An optical switching device comprising:
   (a) an input light beam having a first polarization state;
   (b) an optical retarder transmitting said input fight, said optical retarder changeable from a mode wherein said light is transmitted with said polarization state unchanged to a second mode wherein said polarization state of said light is changed to a second state; and
   (c) a substantially non-retarding polarizing beam splitter reflecting said input light beam received from said optical retarder to a first output if polarized to said first state and transmitting said input light beam to a second output if polarized to said second state.

2. The apparatus of claim 1 wherein said optical retarder comprises a half-wave plate.

3. The apparatus of claim 1 wherein said optical retarder comprises a liquid crystal half-wave plate.

4. The apparatus of claim 1 wherein said optical retarder changes said polarization state of light of a limited wavelength band in said second mode.

5. The apparatus of claim 4 wherein said optical retarder comprises a liquid crystal half-wave plate.

6. An optical switching device comprising:
   (a) an first input light beam having one of a first polarization state and a second polarization state;

(b) a first optical retarder transmitting said first input light beam, said first optical retarder switchable from a mode wherein said light is transmitted with said polarization state unchanged to a second mode changing said polarization state of said light to said other state;

(c) a second input light beam having an optical path substantially orthogonal to an optical path of said first input light beam, said second light beam being polarized to one of said first and said second polarization states;

(d) a second optical retarder transmitting said second input light beam, said second optical retarder switchable from a mode wherein said light is transmitted with said polarization state unchanged to a second mode changing said polarization state of said light to said other state; and (e) a substantially non-retarding polarizing beam splitter reflecting said first input light beam received from said first optical retarder to a first output if polarized to said first state and transmitting said first input light beam to a second output if polarized to said second state and reflecting said second input light beam received from said second optical retarder to said second output if polarized to said first state and transmitting said second input light beam to said first output if polarized to said second state.

7. The apparatus of claim 6 wherein at least one of said first and said second optical retarders comprises a half-wave plate.

8. The apparatus of claim 6 wherein at least one of said first and said second optical retarders comprises a liquid crystal half-wave plate.

9. The apparatus of claim 6 wherein at least one of said first and said second optical retarders changes said polarization state of light of a limited wavelength band in said second mode.

10. The apparatus of claim 9 wherein said optical retarder comprises a liquid crystal half-wave plate.

11. An optical drop device comprising:

(a) an input beam of light polarized to a first state; said beam including light of a first wavelength band and light of a second wavelength band;

(b) a first optical retarder changing a polarization of light of said first wavelength band in said beam to a second state; and (c) a substantially non-retarding first polarizing beam splitter transmitting light in said beam polarized to said first state to a first output and reflecting light polarized to said second state to a second output.

12. The apparatus of claim 11 wherein said optical retarder comprises a half-wave plate.

13. The apparatus of claim 11 wherein said optical retarder comprises a liquid crystal half-wave plate.

14. The apparatus of claim 11 further comprising an analyzer to remove light polarized to a state other than said first state from said input beam.

15. The apparatus of claim 14 wherein said analyzer comprises a polarizing beam splitter.

16. The apparatus of claim 14 wherein said analyzer comprises an optical retarder.

17. The apparatus of claim 11 wherein said optical retarder is switchable from a mode changing said polarization state of said light to said second state to a second mode wherein said light is transmitted by said retarder with said polarization state unchanged.

18. The apparatus of claim 17 wherein said optical retarder comprises a half-wave plate.

19. The apparatus of claim 17 wherein said optical retarder comprises a liquid crystal half-wave plate.

20. The apparatus of claim 11 further comprising:

(a) a second optical retarder receiving light from said first output of said first optical retarder and changing a polarization of light of said second wavelength band to said second state; and (c) a second polarizing beam splitter transmitting light received from said second optical retarder polarized to said first state to a first output of said second beam splitter and reflecting light of said second wavelength band polarized to said second state to a third output.

21. The apparatus of claim 20 wherein at least one of said first and said second optical retarders comprises a half-wave plate.

22. The apparatus of claim 20 wherein at least one of said first and said second optical retarders comprises a liquid crystal half-wave plate.

23. The apparatus of claim 20 further comprising an analyzer to remove light from said input beam polarized to a state other than said first state.

24. The apparatus of claim 20 wherein said analyzer comprises a polarizing beam splitter.

25. The apparatus of claim 20 wherein said analyzer comprises an optical retarder.

26. The apparatus of claim 20 further comprising a reflector reflecting said light at said main beam output to an input of said second polarizing beam splitter.

27. An optical add device comprising:

(a) an input beam of light polarized to a first state; said beam including light of a first wavelength band;

(b) a reflector reflecting light of said input beam polarized to said first state coincident to a first beam path; and (c) a wavelength specific optical retarder changing said polarization of said light of said first wavelength band to a second polarization state while free from changing the polarization of a second wavelength band.

28. The apparatus of claim 27 wherein said optical retarder is switchable from a mode changing said polarization state of said light to said second state to a second mode wherein said light is transmitted by said retarder with said polarization state unchanged.

29. The apparatus of claim 28 wherein said optical retarder comprises a half-wave plate.

30. The apparatus of claim 28 wherein said optical retarder comprises a liquid crystal half-wave plate.

31. The apparatus of claim 28 further comprising an analyzer to remove light polarized to a state other than said second state from light transmitted coincident to said main beam path.

32. The apparatus of claim 31 wherein said analyzer comprises a polarizing beam splitter.

33. The apparatus of claim 21 wherein said analyzer comprises an optical retarder.

34. The apparatus of claim 31 wherein said optical retarder is switchable from a mode changing said polarization state of said light to said second state to a second mode wherein said light is transmitted by said retarder with said polarization state unchanged.

35. The apparatus of claim 34 wherein said optical retarder comprises a liquid crystal half-wave plate.

36. The apparatus of claims 27 wherein said reflector comprises a polarizing beam splitter.

37. An optical add device comprising:

(a) an input beam of light polarized to a first state; said beam including light of a wavelength band;

(b) a wavelength specific optical retarder changing said polarization of light of said wavelength band to a second polarization state; and (c) a reflector reflecting light from said optical retarder to a first output.

38. The apparatus of claim 37 wherein said optical retarder is switchable from a mode changing said polarization state of said light to said second state to a second mode wherein said light is transmitted by said retarder with said polarization state unchanged.

39. The apparatus of claim 37 wherein said optical retarder comprises a liquid crystal half-wave plate.

40. The apparatus of claim 37 further comprising an analyzer to remove light polarized to a state other than said second state from light transmitted coincident to said main beam output.

41. The apparatus of claim 40 wherein said analyzer comprises a polarizing beam splitter.

42. The apparatus of claim 40 wherein said analyzer comprises an optical retarder.

43. An optical crossbar switch comprising:

(a) a plurality of input light beams each of said beams comprising light of substantially non-overlapping wavelengths, said light being polarized to one of a first state and a second state;

(b) a plurality of wavelength band specific optical retarders transmitting said input beams, said optical retarders changeable from a mode passing light with said polarization state unchanged to a second mode changing said polarization state of light in said specific wavelength band to said other state; and (c) a substantially non-retarding polarizing beam splitter reflecting light transmitted from said optical retarders to a first output if said light is polarized to said first state and transmitting said light to a second output if polarized to said second state.

44. The apparatus of claim 43 wherein at least one optical retarder of said plurality of optical retarders comprises a liquid crystal half-wave plate.

45. The apparatus of claim 43 further comprising:

(a) another plurality of wavelength band specific optical retarders receiving said light from said second output of said polarizing beam splitter, said optical retarders switchable from a mode passing light with said polarization state unchanged to a second mode changing said polarization state of light in said specific wavelength band to said other state; and (c) another polarizing beam splitter reflecting light transmitted from said another plurality of optical retarders to another output if said light is polarized to said first state and transmitting said light to another second output if polarized to said second state.

46. The apparatus of claim 45 wherein at least one optical retarder of said plurality of optical retarders and said another plurality of optical retarders comprises a liquid crystal half-wave plate.

47. An optical crossbar switch comprising:

(a) a first plurality of input light beams, each of said beams comprising light of a substantially non-overlapping wavelength band, said light being polarized to one of a first state and second state;

(b) a second plurality of input light beams, each of said beams comprising light of a substantially non-overlapping wavelength band, said light being polarized to one of said first state and said second state;

(c) a plurality of wavelength band specific optical retarders transmitting said input beams of said first and said second pluralities, said optical retarders switchable from a mode passing light with said polarization state unchanged to a second mode changing said polarization state of light of a wavelength band to said other state; and (d) a substantially non-retarding polarizing beam splitter reflecting light of said first plurality of inputs transmitted from a plurality of said optical retarders to a first output if said light is polarized to said first state and transmitting said light to a second output if polarized to said second state and reflecting light of said second plurality of inputs transmitted from a second plurality of said optical retarders to said second output if said light is polarized to said first state and transmitting said light to said first output if polarized to said second state.

48. The apparatus of claim 47 wherein at least one optical retarder of said plurality of optical retarders comprises a liquid crystal half-wave plate.

49. The apparatus of claim 47 wherein an optical path of a beam of said first plurality is substantially orthogonal to an optical path of a beam of said second plurality.

50. An optical switching device comprising:

(a) an input light beam having a first polarization state;

(b) an optical retarder transmitting said input light, said optical retarder changeable from a mode wherein said light is transmitted with said polarization state unchanged to a second mode wherein said polarization state of said light is changed to a second state; and (c) a polarizing beam splitter reflecting said input light beam received from said optical retarder to a first output if polarized to said first state and transmitting said input light beam to a second output if polarized to said second state, wherein said optical retarder comprises a half-wave plate.

51. An optical switching device comprising:

(a) an input light beam having a first polarization state;

(b) an optical retarder transmitting said input light, said optical retarder changeable from a mode wherein said light is transmitted with said polarization state unchanged to a second mode wherein said polarization state of said light is changed to a second state; and (c) a polarizing beam splitter reflecting said input light beam received from said optical retarder to a first output if polarized to said first state and transmitting said input light beam to a second output if polarized to said second state, wherein said optical retarder comprises a liquid crystal half-wave plate.

52. An optical switching device comprising:

(a) an input light beam having a first polarization state;

(b) an optical retarder transmitting said input light, said optical retarder changeable from a mode wherein said light is transmitted with said polarization state unchanged to a second mode wherein said polarization state of said light is changed to a second state; and (c) a polarizing beam splitter reflecting said input light beam received from said optical retarder to a first output if polarized to said first state and transmitting said input light beam to a second output if polarized to said second state, wherein said optical retarder changes said polarization state of light of a limited wavelength band in said second mode.

53. The apparatus of claim 52 wherein said optical retarder comprises a liquid crystal half-wave plate.

54. An optical switching device comprising:

(a) an first input light beam having one of a first polarization state and a second polarization state;

(b) a first optical retarder transmitting said first input light beam, said first optical retarder switchable from a mode wherein said light is transmitted with said polarization state unchanged to a second mode changing said polarization state of said light to said other state;

(c) a second input light beam having an optical path substantially orthogonal to an optical path of said first input light beam, said second light beam being polarized to one of said first and said second polarization states;

(d) a second optical retarder transmitting said second input light beam, said second optical retarder switchable from a mode wherein said light is transmitted with said polarization state unchanged to a second mode changing said polarization state of said light to said other state; and (e) a polarizing beam splitter reflecting said first input light beam received from said first optical retarder to a first output fight beam if polarized to said first state and transmitting said first input Light beam to a second output if polarized to said second state and reflecting said second input light beam received from said second optical retarder to said second output if polarized to said first state and transmitting said second input light beam to said first output if polarized to said second state, wherein at least one of said first and said second optical retarders comprises a half-wave plate.

55. An optical switching device comprising:

(a) an first input light beam having one of a first polarization state and a second polarization state;

(b) a first optical retarder transmitting said first input light beam, said first optical retarder switchable from a mode wherein said light is transmitted with said polarization state unchanged to a second mode changing said polarization state of said light to said other state;

(c) a second input light beam having an optical path substantially orthogonal to an optical path of said first input light beam, said second light beam being polarized to one of said first and said second polarization states;

(d) a second optical retarder transmitting said second input light beam, said second optical retarder switchable from a mode wherein said light is transmitted with said polarization state unchanged to a second mode changing said polarization state of said light to said other state; and (e) a polarizing beam splitter reflecting said first input light beam received from said first optical retarder to a first output if polarized to said first state and transmitting said first input light beam to a second output if polarized to said second state and reflecting said second input light beam received from said second optical retarder to said second output if polarized to said first state and transmitting said second input light beam to said first output if polarized to said second state, wherein at least one of said first and said second optical retarders comprises a liquid crystal half-wave plate.

56. An optical switching device comprising:

(a) an first input light beam having one of a first polarization state and a second polarization state;

(b) a first optical retarder transmitting said first input light beam, said first optical retarder switchable from a mode wherein said light is transmitted with said polarization state unchanged to a second mode changing said polarization state of said light to said other state;

(c) a second input light beam having an optical path substantially orthogonal to an optical path of said first input light beam, said second Light beam being polarized to one of said first and said second polarization states;

(d) a second optical retarder transmitting said second input light beam, said second optical retarder switchable from a mode wherein said light is transmitted with said polarization state unchanged to a second mode changing said polarization state of said light to said other state; and (e) a polarizing beam splitter reflecting said first input light beam received from said first optical retarder to a first output if polarized to said first state and transmitting said first input light beam to a second output if polarized to said second state and reflecting said second input light beam received from said second optical retarder to said second output if polarized to said first state and transmitting said second input light beam to said first output if polarized to said second state, wherein at least one of said first and said second optical retarders changes said polarization state of light of a limited wavelength band in said second mode.

57. The apparatus of claim 56 wherein said optical retarder comprises a liquid crystal half-wave plate.

58. An optical drop device comprising:

(a) an input beam of light polarized to a first state; said beam including light of a first wavelength band and light of a second wavelength band;

(b) a first optical retarder changing a polarization of light of said first wavelength band in said beam to a second state; and (c) a first polarizing beam splitter transmitting light in said beam polarized to said first state to a first output and reflecting light polarized to said second state to a second output, wherein said optical retarder comprises a half-wave plate.

59. An optical drop device comprising:

(a) an input beam of light polarized to a first state; said beam including light of a first wavelength band and light of a second wavelength band;

(b) a first optical retarder changing a polarization of light of said first wavelength band in said beam to a second state; and (c) a first polarizing beam splitter transmitting light in said beam polarized to said first state to a first output and reflecting light polarized to said second state to a second output, wherein said optical retarder comprises a liquid crystal half-wave plate.

60. An optical drop device comprising:

(a) an input beam of light polarized to a first state; said beam including light of a first wavelength band and light of a second wavelength band;

(b) a first optical retarder changing a polarization of light of said first wavelength band in said beam to a second state; and (c) a first polarizing beam splitter transmitting light in said beam polarized to said first state to a first output and reflecting light polarized to said second state to a second output, further comprising an analyzer to remove light polarized to a state other than said first state from said input beam.

61. The apparatus of claim 60 wherein said analyzer comprises a polarizing beam splitter.

62. The apparatus of claim 60 wherein said analyzer comprises an optical retarder.

63. An optical drop device comprising:
(a) an input beam of light polarized to a first state; said beam including light of a first wavelength band and light of a second wavelength band;
(b) a first optical retarder changing a polarization of light of said first wavelength band in said beam to a second state; and
(c) a first polarizing beam splitter transmitting light in said beam polarized to said first state to a first output and reflecting light polarized to said second state to a second output, wherein said optical retarder is switchable from a mode changing said polarization state of said light to said second state to a second mode wherein said light is transmitted by said retarder with said polarization state unchanged.

64. The apparatus of claim 63 wherein said optical retarder comprises a half-wave plate.

65. The apparatus of claim 63 wherein said optical retarder comprises a liquid crystal half-wave plate.

66. An optical drop device comprising:
(a) an input beam of light polarized to a first state; said beam including light of a first wavelength band and light of a second wavelength band;
(b) a first optical retarder changing a polarization of light of said first wavelength band in said beam to a second state;
(c) a first polarizing beam splitter transmitting light in said beam polarized to said first state to a first output and reflecting light polarized to said second state to a second output;
(d) a second optical retarder receiving light from said first output of said first optical retarder and changing a polarization of light of said second wavelength band to said second state; and
(e) a second polarizing beam splitter transmitting light received from said second optical retarder polarized to said first state to a first output of said second beam splitter and reflecting light of said second wavelength band polarized to said second state to a third output.

67. The apparatus of claim 66 wherein at least one of said first and said second optical retarders comprises a half-wave plate.

68. The apparatus of claim 66 wherein at least one of said first and said second optical retarders comprises a liquid crystal half-wave plate.

69. The apparatus of claim 66 further comprising an analyzer to remove light from said input beam polarized to a state other than said first state.

70. The apparatus of claim 66 wherein said analyzer comprises a polarizing beam splitter.

71. The apparatus of claim 66 wherein said analyzer comprises an optical retarder.

72. The apparatus of claim 66 further comprising a reflector reflecting said light to an input of said second polarizing beam splitter.

73. An optical add device comprising:
(a) an input beam of light polarized to a first state; said beam including light of a first wavelength band;
(b) a reflector reflecting light of said input beam polarized to said first state coincident to a first beam path; and
(c) a wavelength specific optical retarder changing said polarization of said light of said first wavelength band to a second polarization state, wherein said optical retarder is switchable from a mode changing said polarization state of said light to said second state to a second mode wherein said light is transmitted by said retarder with said polarization state unchanged.

74. The apparatus of claim 73 wherein said optical retarder comprises a half-wave plate.

75. The apparatus of claim 73 wherein said optical retarder comprises a liquid crystal half-wave plate.

76. The apparatus of claim 73 further comprising an analyzer to remove light polarized to a state other than said second state from light transmitted coincident to said beam.

77. The apparatus of claim 76 wherein said analyzer comprises a polarizing beam splitter.

78. The apparatus of claim 76 wherein said analyzer comprises an optical retarder.

79. The apparatus of claim 76 wherein said optical retarder is switchable from a mode changing said polarization state of said light to said second state to a second mode wherein said light is transmitted by said retarder with said polarization state unchanged.

80. The apparatus of claim 79 wherein said optical retarder comprises a liquid crystal half-wave plate.

81. An optical add device comprising:
(a) an input beam of light polarized to a first state; said beam including Light of a first wavelength band;
(b) a reflector reflecting light of said input beam polarized to said first state coincident to a first beam path; and
(c) a wavelength specific optical retarder changing said polarization of said light of said first wavelength band to a second polarization state, wherein said reflector comprises a polarizing beam splitter.

82. An optical add device comprising:
(a) an input beam of light polarized to a first state; said beam including light of a wavelength band;
(b) a wavelength specific optical retarder changing said polarization of light of said wavelength band to a second polarization state; and
(c) a reflector reflecting light from said optical retarder to a first output, wherein said optical retarder is switchable from a mode changing said polarization state of said light to said second state to a second mode wherein said light is transmitted by said retarder with said polarization state unchanged.

83. An optical add device comprising:
(a) an input beam of light polarized to a first state; said beam including light of a wavelength band;
(b) a wavelength specific optical retarder changing said polarization of light of said wavelength band to a second polarization state; and
(c) a reflector reflecting light from said optical retarder to a first output, wherein said optical retarder comprises a liquid crystal half-wave plate.

84. An optical add device comprising:
(a) an input beam of light polarized to a first state; said beam including light of a wavelength band;
(b) a wavelength specific optical retarder changing said polarization of light of said wavelength band to a second polarization state; and
(c) a reflector reflecting light from said optical retarder to a first output, further comprising an analyzer to remove light polarized to a state other than said second state from light transmitted coincident to said beam.

85. The apparatus of claim 84 wherein said analyzer comprises a polarizing beam splitter.

86. The apparatus of claim 84 wherein said analyzer comprises an optical retarder.

87. An optical crossbar switch comprising:
(a) a plurality of input light beams each of said beams comprising light of substantially non-overlapping wavelengths said light being polarized to one of a first state and a second state;
(b) a plurality of wavelength band specific optical retarders transmitting said input beams, said optical retarders changeable from a mode passing light with said polarization state unchanged to a second mode changing said polarization state of light in said specific wavelength band to said other state; and
(c) a polarizing beam splitter reflecting light transmitted from said optical retarders to a first output if said light is polarized to said first sate and transmitting said fight to a second output if polarized to said second state, wherein at least one optical retarder of said plurality of optical retarders comprises a liquid crystal half-wave plate.

88. An optical crossbar switch comprising:
(a) a plurality of input light beams each of said beams comprising light of substantially non-overlapping wavelengths, said light being polarized to one of a first state and a second state;
(b) a plurality of wavelength band specific optical retarders transmitting said input beams, said optical retarders changeable from a mode passing light with said polarization state unchanged to a second mode changing said polarization state of light in said specific wavelength band to said other state;
(c) a polarizing beam splitter reflecting light transmitted from said optical retarders to a first output if said light is polarized to said first state and transmitting said light to a second output if polarized to said second state;
(d) another plurality of wavelength band specific optical retarders receiving said light from said second output of said polarizing beam splitter, said optical retarders switchable from a mode passing light with said polarization state unchanged to a second mode changing said polarization state of light in said specific wavelength band to said other state; and
(e) another polarizing beam splitter reflecting light transmitted from said another plurality of optical retarders to another output if said light is polarized to said first state and transmitting said light to another second output if polarized to said second state.

89. The apparatus of claim 88 wherein at least one optical retarder of said plurality of optical retarders and said another plurality of optical retarders comprises a liquid crystal half-wave plate.

90. An optical crossbar switch comprising:
(a) a first plurality of input light beams, each of said beams comprising light of a substantially non-overlapping wavelength band, said light being polarized to one of a first state and second state;
(b) a second plurality of input light beams, each of said beams comprising light of a substantially non-overlapping wavelength band, said light being polarized to one of said first state and said second state;
(c) a plurality of wavelength band specific optical retarders transmitting said input beams of said first and said second pluralities, said optical retarders switchable from a mode passing light with said polarization state unchanged to a second mode changing said polarization state of light of a wavelength band to said other state; and
(d) a polarizing beam splitter reflecting light of said first plurality of inputs transmitted from a plurality of said optical retarders to a first output if said light is polarized to said first state and transmitting said light to a second output if polarized to said second state and reflecting light of said second plurality of inputs transmitted from a second plurality of said optical retarders to said second output if said light is polarized to said first state and transmitting said light to said first output if polarized to said second state, wherein at least one optical retarder of said plurality of optical retarders comprises a liquid crystal half-wave plate.

91. An optical crossbar switch comprising:
(a) a first plurality of input light beams, each of said beams comprising light of a substantially non-overlapping wavelength band, said light being polarized to one of a first state and second state;
(b) a second plurality of input light beams, each of said beams comprising light of a substantially non-overlapping wavelength band, said light being polarized to one of said first state and said second state;
(c) a plurality of wavelength band specific optical retarders transmitting said input beams of said first and said second pluralities, said optical retarders switchable from a mode passing light with said polarization state unchanged to a second mode changing said polarization state of light of a wavelength band to said other state; and
(d) a polarizing beam splitter reflecting light of said first plurality of inputs transmitted from a plurality of said optical retarders to a first output if said light is polarized to said first state and transmitting said light to a second output if polarized to said second state and reflecting light of said second plurality of inputs transmitted from a second plurality of said optical retarders to said second output if said light is polarized to said first state and transmitting said light to said first output if polarized to said second state, wherein an optical path of a beam of said first plurality is substantially orthogonal to an optical path of a beam of said second plurality.

* * * * *

UNITED STATES PATENT AND TRADEMARK OFFICE
CERTIFICATE OF CORRECTION

PATENT NO. : 6,618,516 B1 Page 1 of 1
DATED : September 9, 2003
INVENTOR(S) : Huang It is certified that error appears in the above-identified patent and that said Letters Patent is hereby corrected as shown below:

Column 8,
Line 17, change "and half wave plates." to -- and half-wave plates. --

Column 10,
Line 8, change "(c) a second" to -- (b) a second --
Line 63, change "of claims 27" to -- of claim 27 --

Column 11,
Line 47, change "(c ) another polarizing" to -- (b) another polarizing --

Column 17,
Line 15, change "first sate and" to -- first state and --

Signed and Sealed this

Eighth Day of March, 2005

JON W. DUDAS
*Director of the United States Patent and Trademark Office*

UNITED STATES PATENT AND TRADEMARK OFFICE
CERTIFICATE OF CORRECTION

PATENT NO. : 6,618,516 B1
DATED : September 9, 2003
INVENTOR(S) : Huang

It is certified that error appears in the above-identified patent and that said Letters Patent is hereby corrected as shown below:

Column 3,
Line 49, change "an $\omega_1$, wavelength" to -- an $\omega_1$ wavelength --.
Line 53, change "the $\omega_1$, half-wave" to -- the $\omega_1$ half-wave --.

Column 4,
Line 63, change "$\omega_1$, polarizing" to -- $\omega_1$ polarizing --.

Column 5,
Line 14, change "the $\omega_1$ $\omega_2$, and $\omega_3$" to -- the $\omega_1$, $\omega_2$, and $\omega_3$ --.
Line 57, change "the $\omega_3$ wavelength" to -- the $\omega_1$ wavelenth --.
Line 63, change "$\omega_3$ half-wave plate" to -- $\omega_2$ half-wave plate --.

Column 6,
Line 20, change "switchable, A wavelength" to -- switchable, $\omega_1$ wavelength --.

Column 7,
Lines 23-24, change "switchable $\omega_3$ wavelength" to -- switchable $\omega_3$ wavelength --.
Line 47, change "s-polarized A wavelength" to -- s-polarized $\omega_1$ wavelength --.
Line 54, change "the spolarized light" to -- the s-polarized light --.

Column 8,
Line 46, change "said input fight," to -- said input light, --.

UNITED STATES PATENT AND TRADEMARK OFFICE
CERTIFICATE OF CORRECTION

PATENT NO.    : 6,618,516 B1
DATED         : September 9, 2003
INVENTOR(S)   : Huang It is certified that error appears in the above-identified patent and that said Letters Patent is hereby corrected as shown below:

Column 13,
Line 19, change "output fight beam" to -- output light beam --.
Line 20, change "input Light beam" to -- input light beam --.

Column 16,
Line 24, change "including Light of" to -- including light of --.

Column 17,
Line 15, change "transmitting said fight" to -- transmitting said light --.

Signed and Sealed this

Twenty-ninth Day of November, 2005

JON W. DUDAS
*Director of the United States Patent and Trademark Office*